US011105427B2

(12) United States Patent
Dentro et al.

(10) Patent No.: US 11,105,427 B2
(45) Date of Patent: Aug. 31, 2021

(54) GATE VALVE WITH REPLACEABLE WEAR RING

(71) Applicant: IHC Holland IE B.V., Sliedrecht (NL)

(72) Inventors: Niels Dentro, Delft (NL); Dennis Boudestijn, Delft (NL)

(73) Assignee: IHC Holland IE B.V., Sliedrecht (NL)

( * ) Notice: Subject to any disclaimer, the term of this patent is extended or adjusted under 35 U.S.C. 154(b) by 0 days.

(21) Appl. No.: 16/633,219

(22) PCT Filed: Jul. 24, 2018

(86) PCT No.: PCT/NL2018/050512
§ 371 (c)(1),
(2) Date: Jan. 23, 2020

(87) PCT Pub. No.: WO2019/022597
PCT Pub. Date: Jan. 31, 2019

(65) Prior Publication Data
US 2020/0182359 A1  Jun. 11, 2020

(30) Foreign Application Priority Data
Jul. 24, 2017 (NL) ..................... 2019327

(51) Int. Cl.
*F16K 3/30* (2006.01)
*F16K 3/02* (2006.01)
*F16K 3/20* (2006.01)
*F16K 3/04* (2006.01)
F16L 57/06 (2006.01)

(52) U.S. Cl.
CPC .............. *F16K 3/30* (2013.01); *F16K 3/0263* (2013.01); *F16K 3/04* (2013.01); *F16K 3/20* (2013.01); *F16L 57/06* (2013.01); *Y10T 137/7036* (2015.04)

(58) Field of Classification Search
CPC . F16K 3/30; F16K 3/0263; F16K 3/20; F16K 3/314; F16K 3/04; F16L 57/06; Y10T 137/7036
USPC .................. 251/326–329, 300–302; 137/375
See application file for complete search history.

(56) References Cited

U.S. PATENT DOCUMENTS

| 1,613,138 | A |   | 1/1927  | Seymour et al. |
| 1,691,779 | A | * | 11/1928 | McDonald ........... B23K 11/002 |
|           |   |   |         | 219/107 |
| 1,995,727 | A | * | 3/1935  | Wetherbee ................ C21B 9/12 |
|           |   |   |         | 137/340 |

(Continued)

FOREIGN PATENT DOCUMENTS

| CN | 2384058 Y   | 6/2000 |
| CN | 104653800 A | 5/2015 |
| CN | 105546139 A | 5/2016 |

*Primary Examiner* — John Bastianelli
(74) *Attorney, Agent, or Firm* — N. V. Nederlandsch Octrooibureau; Catherine A. Shultz; Katelyn J. Bernier

(57) ABSTRACT

A gate valve includes a first plate with a first opening; a second plate with a second opening positioned opposite the first plate such that the first opening is aligned with the second opening; a gate with a gate opening positioned between the first plate and second plate and movable from a close position where the gate blocks flow through the first opening and the second opening and an open position where the gate opening aligns with the first opening and the second opening to allow flow through the valve; and a wear ring lining the gate opening.

10 Claims, 4 Drawing Sheets

(56) References Cited

U.S. PATENT DOCUMENTS

| | | | | |
|---|---|---|---|---|
| 2,903,564 | A | * | 9/1959 | Carr ........................ F16K 25/04 |
| | | | | 219/107 |
| 3,367,625 | A | * | 2/1968 | Ronald .................. F16K 3/207 |
| | | | | 251/172 |
| 3,837,356 | A | * | 9/1974 | Selep ...................... F16K 3/312 |
| | | | | 137/375 |
| 4,372,531 | A | * | 2/1983 | Rollins ................ F16K 27/044 |
| | | | | 251/174 |
| 4,911,410 | A | | 3/1990 | Baker |
| 5,377,955 | A | * | 1/1995 | Baker .................. F16K 3/0263 |
| | | | | 251/327 |
| 5,501,424 | A | | 3/1996 | Williams et al. |
| 6,776,392 | B1 | * | 8/2004 | Reilly ....................... F16K 1/36 |
| | | | | 251/186 |
| 8,662,473 | B2 | * | 3/2014 | Comeaux .................. F16K 3/20 |
| | | | | 251/174 |
| 2013/0334453 | A1 | * | 12/2013 | Blenkush ................. F16K 3/30 |
| | | | | 251/360 |

\* cited by examiner

GATE VALVE WITH REPLACEABLE WEAR RING

BACKGROUND

Gate valves are commonly used in pipeline systems suitable for slurries, for example, in the dredging and mining industry. The valve is typically formed of a gate made from a solid plate with a passage in it to function as the opening through which the slurry can flow. Gate valves are typically sliding gate valves and optionally rotational gate valves.

Optionally the gate is located between two plates which can be under pre-tension and can be operated to slide or rotate by an hydraulic or electric cylinder. Pre-tensioning can be done using bolts and springs, for example, and the pre-tension results in the plates and gate being pressed together such that silt and sand is prevented from entering the housing.

Silt and other particles in the flow can become trapped in the gate valve housing during use, which can cause failures of the sliding mechanism in that either the sliding mechanism can no longer slide or rotate and/or leakage occurs between the static and moving parts when the valve is open. The silt and particles become trapped between the pre-tensioned plates in a closed valve position, making the valve rotation or sliding difficult or impossible. Typically such a situation is addressed with an expensive flushing system that can flush away the silt within the gate valve housing and sliding or rotating components.

U.S. Pat. No. 4,911,410 shows shearing type of gate valve having a sleeve of hard wear resistant material in the opening through the gate and coacting with insert rings of hard, wear resistant material in the seat rings for shearing a wire line or tubular member extending through the valve and the gate, the sleeve and insert ring being assembled with the gate and the seat rings in a manner to provide sufficient compression preload thereon so that they are not subjected to tension loads which avoids chipping, breaking or other damage to the sleeve and the insert rings. Preferably the sleeve and insert rings are of tungsten carbide.

U.S. Pat. No. 5,501,424 shows a gate valve assembly for controlling fluid flow that is provided with wireline-cutting inserts loose-fitted in either of, or both of, the gate opening and at least one of the seats. Each insert has a length that prohibits it from extending beyond the opening in which it is received so that the contact surface between the gate and an adjacent seat forms a continuous seal and the inserts serve only a wireline-cutting function, thus eliminating the possibility of sealing surfaces being damaged by wireline-cutting.

Thus, each of U.S. Pat. No. 4,911,410 and U.S. Pat. No. 5,501,424 are directed toward shearing or cutting wireline.

SUMMARY OF THE INVENTION

According to a first aspect of the invention, a gate valve comprises a first plate with a first opening; a second plate with a second opening positioned opposite the first plate such that the first opening is aligned with the second opening; a gate with a gate opening positioned between the first plate and second plate and movable from a closed position where the gate blocks flow through the first opening and the second opening and an open position where the gate opening aligns with the first opening and the second opening to allow flow through the valve; and a wear ring lining the gate opening.

Such a gate valve with a wear ring lining the gate opening can help to prolong the life of the gate and overall valve. The common use in dredging and mining subjects a gate valve to much wear, particularly the gate through which the slurry flows. By including a wear ring to line the gate opening, the wear ring, which may be a more wear resistant material is subject to the wear instead. This can prolong the life of the gate, and can even allow for simply removing and/or replacing the wear ring (instead of the overall gate or valve) when the wear ring has been subject to a certain amount of wear.

According to an embodiment, the wear ring is replaceably secured to the gate. This can allow for easy removal and/or replacement when needed. Optionally, wherein the wear ring is bolted to the gate or welded to the gate. Welding or bolting ensures that the wear ring is securely attached, and can be easily removed and/or replaced when needed.

According to an embodiment, the wear ring is white cast iron. This could be, for example, Maxidur®-5, MaXtop® and/or Wearmet®. Such a material provides strong wear resistance for the wear ring to properly function and prolong the useful life of the gate and/or gate valve.

According to an embodiment, the gate and the wear ring are different materials. This allows for using a more wear resistant material for the wear ring, and, for example, a more cost-effective and/or lighter-weight material for other parts of the gate subject to less wear. According to an embodiment, the wear ring sits flush with the gate. This ensures that flow through the gate is not inhibited by the wear ring and that there is proper sealing in the housing of the gate.

According to an embodiment, the wear ring extends from the first plate to the second plate such that no part of the gate is exposed to flow when in an open position. This ensures that the wear ring is the only part of the gate that is subject to flow, and thus the only part experiencing the resulting wear.

According to an embodiment, the gate is rotatably movable. This rotatable movement can be, for example, upward to close and downward to open. Such a rotatable movement can help to encourage any trapped particles re-enter the flow when the gate is rotated downward to an open position.

According to an embodiment, the first plate and the second plate are pre-tensioned. The pre-tensioning can ensure the gate stays leak-tight to not allow any flow or particles to fall into the housing potentially inhibiting the gate and/or valve operation. Optionally, the pre-tension has different amounts of force in different positions of the first plate and/or the second plate. This can allow for relatively easier movement of gate by applying a smaller pretensioning force to areas no directly at sealing areas, while maintaining a high pre-tension force to sealing areas to reduce or eliminate trapped silt rocks or other particles from falling into housing.

According to an embodiment, the wear ring is about 5 mm-25 mm thick. For example, this could be in the range of 8 mm-15 mm thick, 10 mm-12 mm thick. The thickness can depend on the material expected to flow through as well as other factors regarding the sizing and use of the gate valve.

According to an embodiment, the valve further comprises a gate housing fixed around the first plate, second plate, and gate; with the first plate and second plate fixed with respect to the gate housing and the gate being rotatably secured to the gate housing. The housing can help to protect the overall gate and components.

According to a further aspect of the invention, a method of reinforcing a gate valve comprises obtaining a gate valve comprising a gate with a gate opening movably positioned between first and second plates such that the gate is movable to an open position allowing flow through the gate opening and the valve and a closed position blocking flow through the valve; and securing a wear ring along an inner side of the gate opening. Such a method can form a strong stable gate that is resistant to wear from flow through the gate.

According to an embodiment, the step of securing a wear ring along an inner side of the gate opening comprises securing a wear ring to the inner side of the gate opening such that when the gate is in an open position only the wear ring is exposed to flow through the gate.

According to an embodiment, the step of securing a wear ring comprises bolting, welding or clamping a wear ring to the gate. Such securing can allow for easy removal and/or replacement when needed while ensure wear ring stays securely with gate during use.

According to an embodiment, the method further comprises forming a wear ring such that it can be secured within the gate opening.

According to a further aspect of the invention, a method of reinforcing a gate for a gate valve comprises forming a wear ring such that it can be secured to and cover the exposed parts of a gate when the gate is in a valve open position; and securing the wear ring to a gate. Such a method can prolong the life of a gate and overall gate valve by having a wear ring on the parts which will be subject to wear. The wear ring could be made of a material which resists wear, and can be easily replaced when needed without needing to replace the entire gate or gate valve.

SHORT DESCRIPTION OF DRAWINGS

The present invention will be discussed in more detail below, with reference to the attached drawings, in which FIG. 1a is a perspective view of a gate valve;

FIG. 1d shows a cross-sectional view of the gate valve of FIG. 1a;

DESCRIPTION OF EMBODIMENTS

Figure 1A:
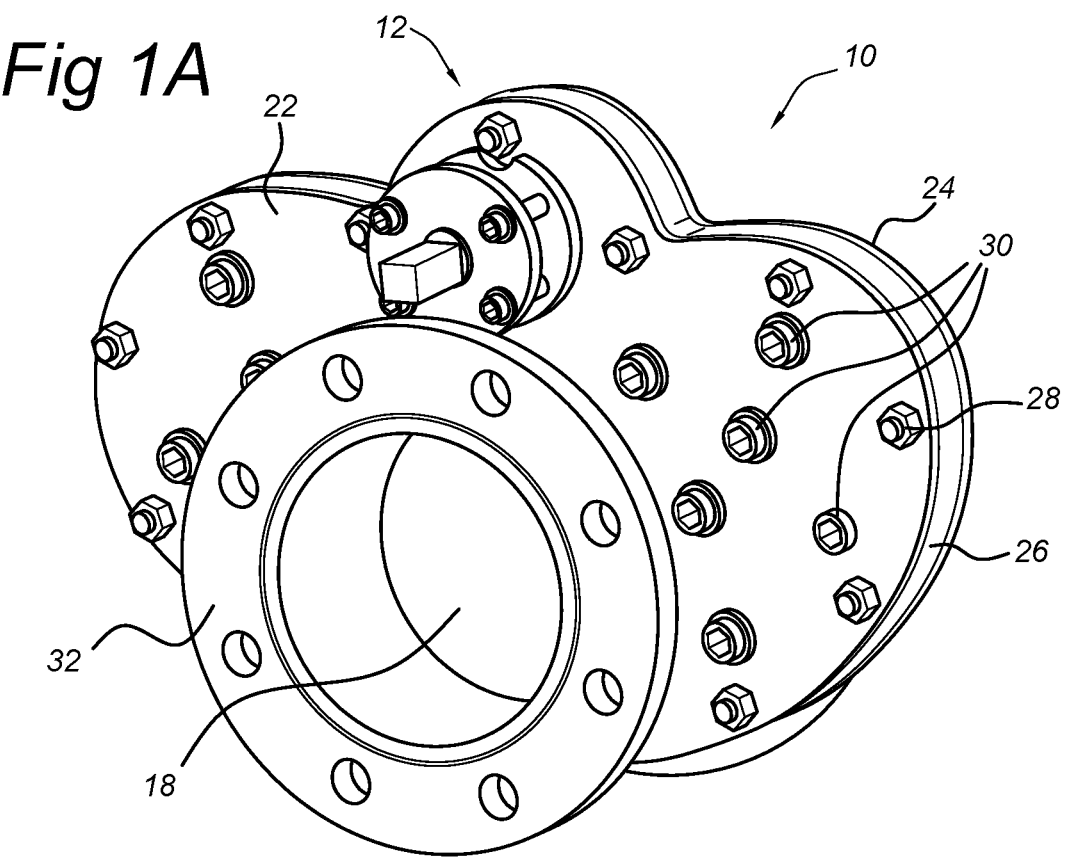
Figure 1B:
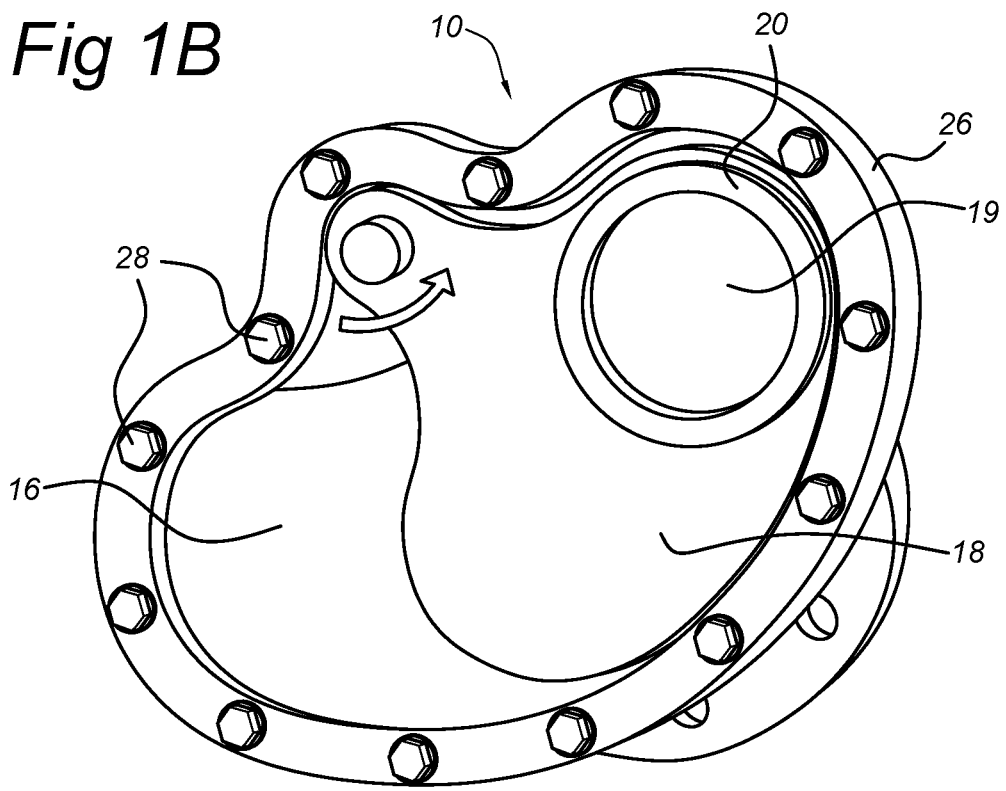
FIG. 1b is a perspective view of the gate valve of FIG. 1a in a closed position and with some outer parts removed for viewing purposes.
Figure 1C:
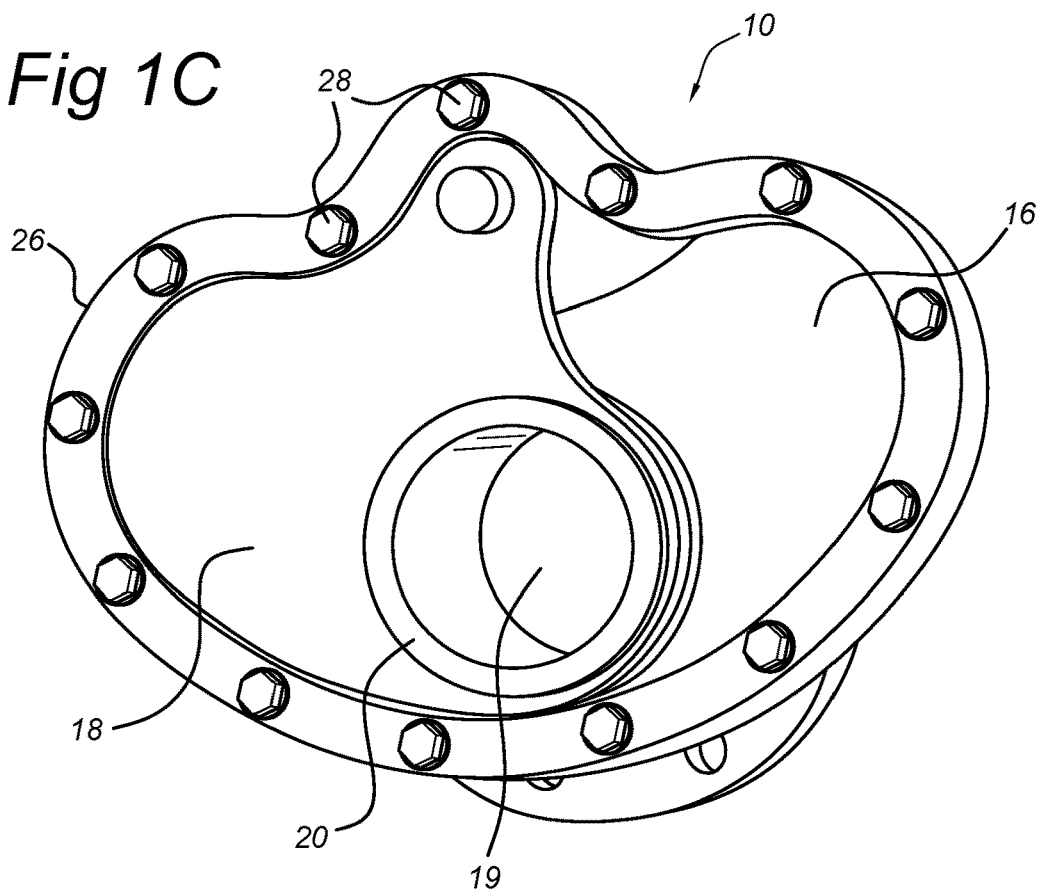
FIG. 1c is a view of the FIG. 1b in an open position.
Figure 1D:
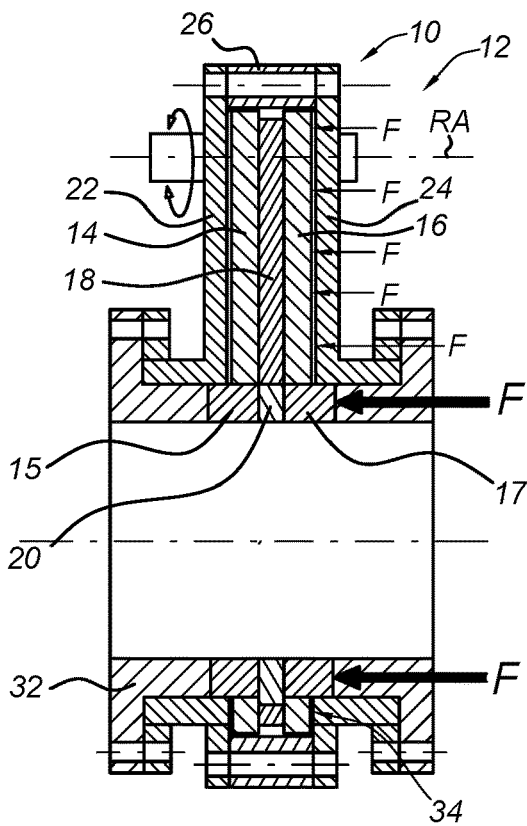
Figure 1E:
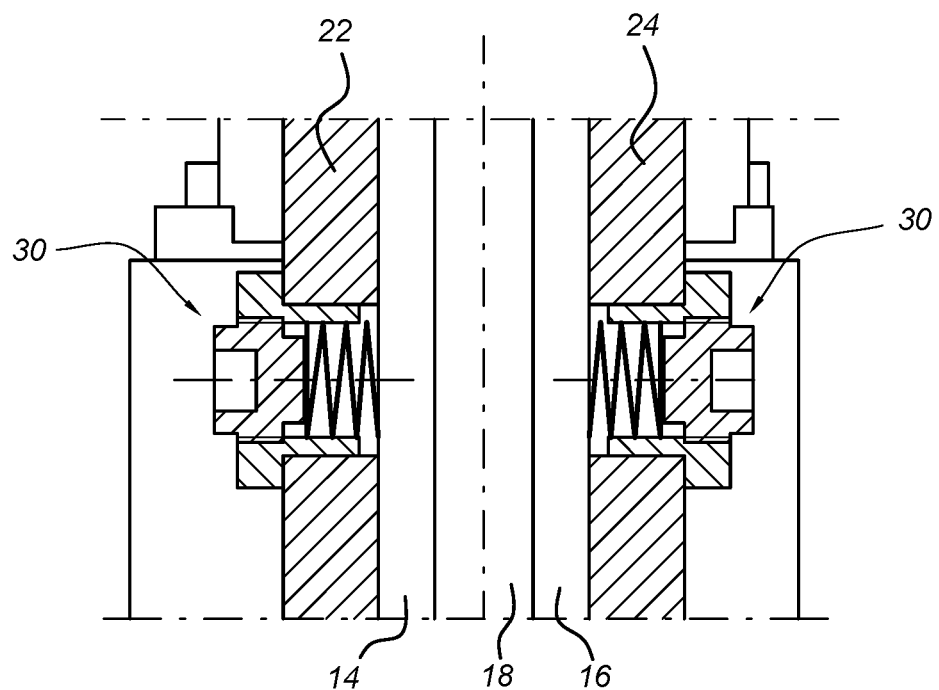
FIG. 1e shows a cross-sectional close up view of a pre-tensioning member.

FIG. 1a is a perspective view of gate valve 10; FIG. 1b is a perspective view of gate valve 10 in a closed position and with a part of housing 12 and first plate 14 removed for viewing purposes; FIG. 1c shows gate valve 10 of FIG. 1b in an open position; FIG. 1d shows a cross-sectional view of gate valve 10, and FIG. 1e shows a close up cross-sectional view of pre-tensioning members.

Gate valve 10 includes housing 12, first plate 14 with first sealing area 15 defining an opening, second plate 16 with second sealing area 17 defining an opening, gate 18 with gate opening 19 and wear ring 20 and axis of rotation RA. Housing 12 includes front 22, back 24, side 26 with bolts 28 and pre-tensioning members 30. Also shown are pipes 32, 34 connecting to either side of gate valve 10.

Housing front 22 connects to back 24 though side 26 and is secured by bolts 28. In this embodiment, pre-tensioning member 30 are bolts and/or springs that extend through housing front 22 and/or back 24 to tension first and/or second plates 12, 14 toward gate 18.

Wear ring 20 is shaped to cover the inner diameter of gate 18 surrounding opening 19, and extends from first plate 14 to second plate 16 in gate valve 10. Wear ring can be formed of a wear-resistant materials, such as white cast irons, for example, Maxidur®-5, MaXtop® and/or Wearmet®. Wear ring 20 is secured to gate 18. Wear ring 20 is typically a different material from that of gate 18, though in some embodiments could be the same material, and is typically in the range of about 5 mm to about 25 mm, for example, 8-15 mm or even 10-12 mm in thickness. The connection can be releasable such that wear ring can be removed and replaced as needed. The securing of wear ring 20 to gate can take many forms, for example, bolting, clamping or welding wear ring 20 to gate, and forming wear ring 20 such that a tight connection is formed and is held in gate in tension.

First plate 14 and second plate 16 are fixed within housing 12 such that sealing areas 15, 17 which define the openings in first and second plates 14, 16 align. Gate 18 is rotatable around axis of rotation RA within housing 12, such that opening 19 aligns with the openings through first and second plates 14, 16 when gate valve 10 is in an open position as shown in FIG. 1c. Gate 18 then rotates to a closed position, as shown in FIG. 1b, where opening 19 of gate 18 does not align with the openings of first and second plates 14, 16. When gate 18 is in an open position, flow is allowed through openings of first plate 14, gate 18 and second plate 16 to allow flow from first pipe 32 to second pipe 34.

As mentioned in the background, when gate 18 moves from an open position (FIG. 1c) allowing flow to a closed position (FIG. 1b) blocking flow, some of the materials flowing get trapped in gate 18 opening 19. It is important to ensure that the materials remain within opening 19 and do not fall into other parts of housing 12. The pre-tensioning system helps with this, though the stronger the pre-tension pressure, the more difficult it is to move gate 18 within housing 12. Additionally, by using an upward movement for bringing the gate to a closed position (See FIG. 1b), the downward movement to the open position helps to ensure that any material trapped during the closed position re-enters the flow when gate 18 is rotated back to an open position.

Gate valve 10 helps to reduce or eliminate this trapped silt, rocks or other particles from falling into housing by applying a larger pre-tensioning force around sealing areas 15, 17 while allowing for relatively easier movement of gate 18 by applying a smaller pretensioning force to other areas of first and second plates 14, 16. As shown in FIG. 1d, pre-tensioning members 30 of gate valve 10 are tensioned according to their position with respect to the sealing area 15, 17 of first and second plates 14, 16. This is illustrated by the force arrows F in FIG. 1d. A higher pre-tension force is applied on the sealing areas 15, 17 surrounding the openings as indicated by the relative size of arrows F in each position. By applying a different amount of pre-tensioning force at sealing areas 15, 17; gate valve 10 can ensure that any silt trapped in gate 18 opening 19 when gate 18 is in a closed position does not fall down into valve housing 12. This is particularly prone to happening when gate 18 is moving from an open to closed position or vice versa, and applying a higher pretension around the flow area ensures that the silt, rocks or other material trapped in gate 18 opening 19 is held in gate opening 19 until joining the flow when gate 18 is back in an open position. Having a smaller pre-tension force further away from the openings 15, 17 allows for easier movement of gate 18 within housing 12, allowing for less force required to operate gate valve 10. In some embodiments, different material could be used in sealing area to further assist in the sealing while allowing for movement of gate 18.

Because gate valves such as gate valve 10 are often used in pipeline systems in the dredging and mining industry, they are often subject to wear due to the nature of the pumped fluids and slurries which often include silt, rocks and other abrasive material. This wear is particularly great around the opening 19 of gate 18 as all the pumped material flows through that point. Wear ring 20 helps to cope with this flow of abrasive materials in the transport fluid by being the only part of gate 18 that is exposed to flow when gate 18 is in an open position. At a certain point, all valves functionally fail due to use. Wear ring 20 allows for the easy removal and replacement of a small component rather than the entire gate 18 or valve 10 when gate valve 10 reaches such a point. The wear ring 20 can be either partially or wholly removed, and replaced by securing a new wear ring 20 to gate 18 and/or replacing only worn parts of wear ring 20 with new material. The securing of the new wear ring can be in a number of different ways, including but not limited to bolting, clamping and welding.

Including a wear ring 20 and a pre-tensioning system with different amounts of tension in different areas can functionally extend the overall life of gate valve 10 and make for easier maintenance of gate valve 10. The different levels of pre-tensioning allows for stronger sealing in the areas where needed, while having less (but adequate) force in other areas to allow for easier movement of gate 18. Wear ring 20 improves wear resistance of gate 18 and overall gate valve 10, and allows for easy removal and/or replacement as part of maintenance operations when the part most exposed is worn down instead of needing to replace all of gate 18 and/or gate valve 10. Additionally, gate valve can help to avoid the expensive flushing operations needed for past gate valves when they experienced silt or other materials falling into the housing.

Figure 2:
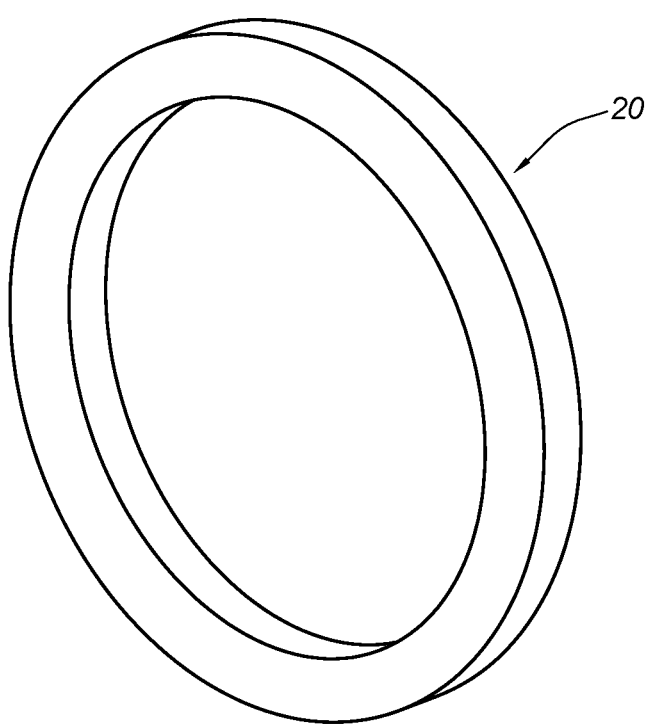
FIG. 2 shows a perspective view of a wear ring for a gate valve.

FIG. 2 shows a perspective view of a wear ring 20 for gate valve 10. As discussed in relation to FIGS. 1*a*-1*d,* wear ring 20 secures to an inner circumference of opening 19 of gate 19, being the only exposed surface of gate 18 when valve 10 is in an open position. As such, wear ring 20 and not gate 18 is the only part vulnerable for abrasive fluid and worn down during flow. Wear ring 20 can then be easily removed and/or replaced when needed without having to remove all the plates or the overall valve.

Wear ring 20 can also be added to existing gate valves such that a life of an existing gate valve is extended. The wear ring 20 can be secured around the inner surface of the opening and sized to extend from first plate 14 to second plate 16 such that it is the only part of gate 18 exposed to the flow through valve 10. In this manner, wear ring 20 can also help to extend the working lifespan of existing or prior art gate valves 10.

Figure 3:
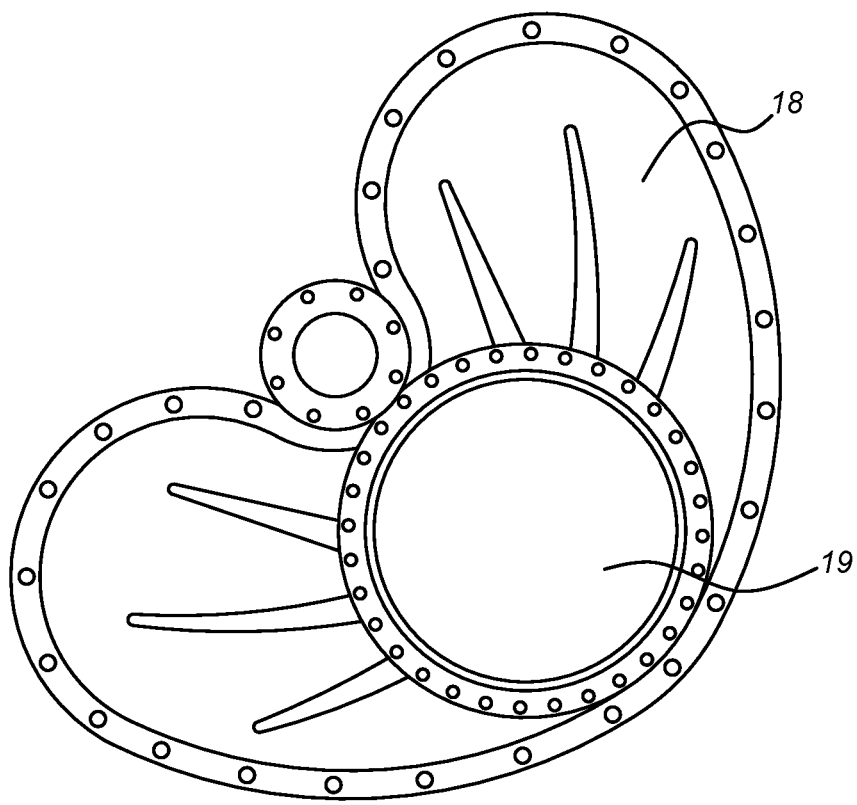
FIG. 3 shows a further embodiment of a gate for a gate valve.

FIG. 3 shows a further embodiment of a gate 40 for a gate valve 10. Gate 40 is a pendulum valve gate with a wear ring 20 as described in relation to FIGS. 1*a*-2; The pendulum valve gate 40 operates in much the same manner, though can rotatably move in both directions around an axis of rotation RA. This could, for example, allow for the gate valve to allow or block flow from a number of different pipes. The pendulum also ensures that the gate 18 is able to move in an upward direction for closing to help ensure any particles trapped during a closed position are encouraged to re-enter the flow when gate 18 is opened due to the downward movement and gravitational forces. Gate 18 of FIG. 3 also includes ribs 36 to reinforce gate 18 and overall valve.

Housing 22, valve 10 components and/or pre-tensioning members 30 could take a number of different forms in different gate valves, and those shown in FIGS. 1*a*-3 are for example purposes only.

The present invention has been described above with reference to a number of exemplary embodiments as shown in the drawings. Modifications and alternative implementations of some parts or elements are possible, and are included in the scope of protection as defined in the appended claims.

The invention claimed is:

1. A gate valve for a flow with particles, the gate valve comprising:
    a first plate with a first opening;
    a second plate with a second opening positioned opposite the first plate such that the first opening is aligned with the second opening;
    a gate with a gate opening positioned between the first plate and second plate and movable from a closed position where the gate blocks flow through the first opening and the second opening and an open position where the gate opening aligns with the first opening and the second opening to allow flow through the valve;
    a wear ring lining the gate opening, wherein the wear ring is replaceably secured to the gate wherein the first plate and the second plate are pre-tensioned with one or more pre-tension members applying axial force on the first plate and/or the second plate;
    wherein the pre-tension has different amounts of force in different positions of the first plate and/or the second plate;
    wherein the pre-tension has different amounts of force in different positions by using a plurality of pre-tensioning members to apply different amounts of axial force in different positions of the first plate and/or the second plate;
    wherein a stronger pre-tensioning force is applied around first opening and/or second opening, and a smaller pre-tensioning force is applied in areas of first and/or second plates further away from first opening and/or second opening.

2. The gate valve of claim 1, wherein the wear ring is bolted to the gate.

3. The gate valve of claim 1, wherein the wear ring is white cast iron.

4. The gate valve of claim 1, wherein the gate and the wear ring are different materials.

5. The gate valve of claim 1, wherein the wear ring sits flush with the gate.

6. The gate valve of claim 1, wherein the wear ring extends from the first plate to the second plate such that no part of the gate is exposed to flow when in an open position.

7. The gate valve of claim 1, wherein the wear ring is welded to the gate.

8. The gate valve of claim 1, wherein the gate is rotatably movable.

9. The gate valve of claim 1, wherein the wear ring is about 5 mm-25 mm thick.

10. The gate valve of claim 1, and further comprising a gate housing fixed around the first plate, second plate, and gate;
    wherein the first plate and second plate are fixed with respect to the gate housing and the gate is rotatably secured to the gate housing.

* * * * *